US00RE37007E

(19) United States
(12) Reissued Patent
Gerlier

(10) Patent Number: US RE37,007 E
(45) Date of Reissued Patent: Jan. 2, 2001

(54) DEVICE FOR ALIGNING SHEETS WITH PLURAL DRIVE ROLLER GROUPS ON A COMMON SHAFT

(75) Inventor: André Gerlier, Sciez (FR)

(73) Assignee: Mars Incorporated, McLean, VA (US)

(21) Appl. No.: 08/292,408

(22) Filed: Aug. 18, 1994

Related U.S. Patent Documents

Reissue of:
(64) Patent No.: 5,140,166
Issued: Aug. 18, 1992
Appl. No.: 07/618,483
Filed: Nov. 27, 1990

(30) Foreign Application Priority Data

Dec. 7, 1989 (CH) ..... 4401/89

(51) Int. Cl.[7] ..... G01N 21/86
(52) U.S. Cl. ..... 250/548; 271/227
(58) Field of Search ..... 250/548, 557, 250/223 R, 559.37, 559.3; 271/227, 228, 272, 273, 274; 198/401, 415, 394, 395

(56) References Cited

U.S. PATENT DOCUMENTS 3,603,446 * 9/1971 Maxey et al. ..... 198/401
4,163,157 * 7/1979 Guignard et al. ..... 250/559.37
4,438,917 * 3/1984 Janssen et al. ..... 271/227
4,833,591 * 5/1989 Eckl ..... 271/238
4,855,607 * 8/1989 Eckl ..... 250/557
4,971,304 * 11/1990 Lofthus ..... 271/227
4,987,448 * 1/1991 Chikama ..... 250/548
5,078,384 * 1/1992 Moore ..... 271/228
5,090,683 * 2/1992 Kamath et al. ..... 271/227
5,094,442 * 3/1992 Kamprath et al. ..... 271/227

FOREIGN PATENT DOCUMENTS

3441977 * 5/1985 (DE) .
0206675 * 12/1986 (EP) .
4163157 * 7/1979 (FR) .

* cited by examiner

*Primary Examiner*—John R. Lee
(74) *Attorney, Agent, or Firm*—Fish & Richardson P.C.

(57) ABSTRACT

In a sheet feeding device, the local feed of the sheet is measured in the vicinity of respective drive rollers by means of respective sensors for the purpose of aligning rectangular sheets of a preselected set. On the basis of signals from the light sensors, a control device determines an optimum pair of rollers for aligning the sheet. The control device compares the signals of the two associated sensors and adjusts the local feed of the sheet in such a way that the two sensors establish the same local feed, before the sheet leaves one of the selected rollers.

20 Claims, 2 Drawing Sheets

DEVICE FOR ALIGNING SHEETS WITH PLURAL DRIVE ROLLER GROUPS ON A COMMON SHAFT

Matter enclosed in heavy brackets [ ] appears in the original patent but forms no part of this reissue specification; matter printed in italics indicates the additions made by reissue.

FIELD OF THE INVENTION

This invention relates to a device for aligning sheets, such as bank notes in automatic service machines.

If rectangular sheets are guided between conveyor belts or between rollers on long, winding transportation paths where there are a number of points of transfer from the transportation means to a stacking device or checking device, twisting of the individual sheets in their plane from the ideal position can arise. Particularly often, twisting arises to a great extent when the sheet is put in by hand, e.g. when a bank note is put into the automatic service machine. These automatic machines and devices therefore need to have an aligning device.

DESCRIPTION OF THE PRIOR ART

With a known mechanical aligning device (DE-OS 34 41 977), a longitudinal edge of a bank note is pushed against a displaceable locking plate arranged perpendicularly to the transportation path and perpendicularly to the plane of alignment, and the bank note is aligned in this way on the locking plate. The locking plate is then removed from the transportation path and the bank note which has been retained for a short time is transported further.

SUMMARY OF THE INVENTION

The aim of the invention is to provide a device of the kind mentioned in the introduction, which aligns rectangular sheets of a predetermined set of different sized sheets quickly and reliably with a predetermined side parallel to its feed direction.

In accordance with the invention, there is provided a device for aligning a sheet fed in a plane of alignment in a feed direction, comprising:

at least two drive groups which are controllable independently of each other, each drive group comprising a respective drive roller, the axes of the drive rollers extending transversely of the feed direction, and a respective pressure roller which contacts the respective drive roller generally in the plane of alignment so that the sheet can be driven between the drive roller and the respective pressure roller;

a position detector operable to detect an angle of twist of the sheet; and a control device responsive to the position detector to adjust a local feed speed of each drive group in dependence upon the angle of twist of the sheet.

DESCRIPTION OF THE PREFERRED EMBODIMENTS

Figure 1:
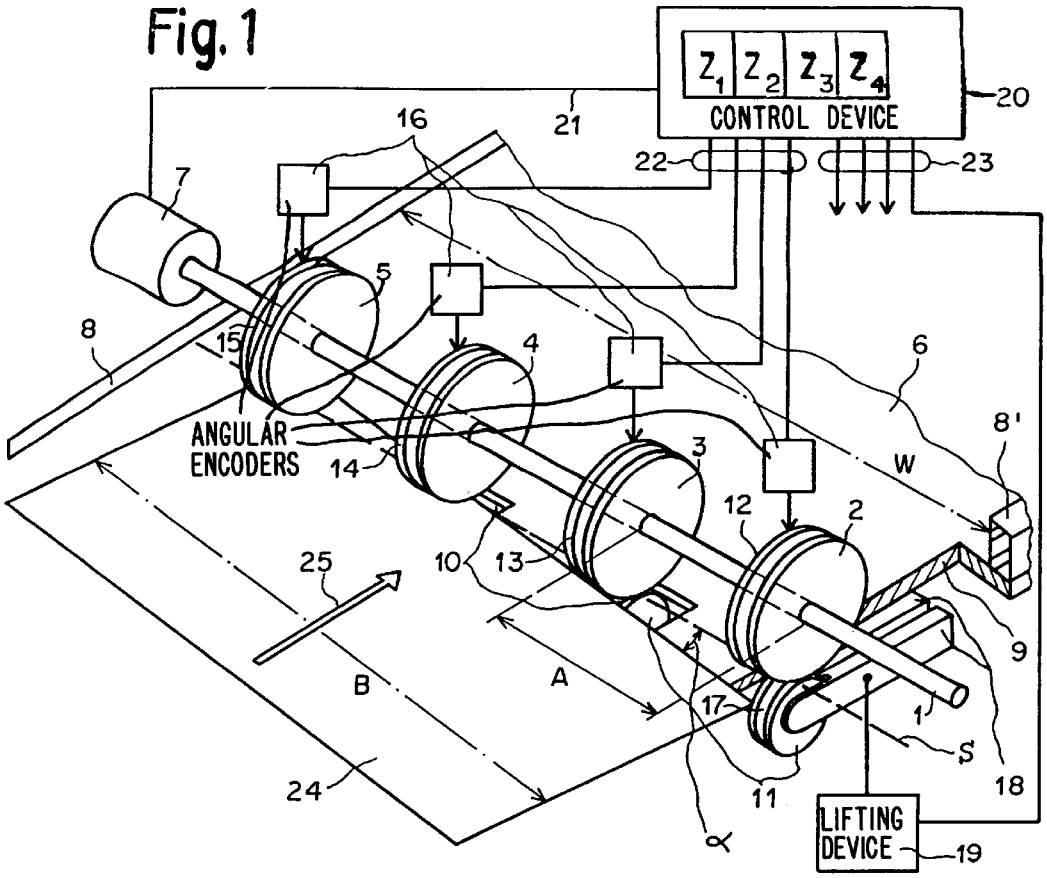
FIG. 1 shows an aligning device.

In FIG. 1, a drive shaft 1 is shown with drive rollers 2 to 5 of equal size arranged on the drive shaft 1 at equal distances A apart, and fixedly connected thereto. As an example, the drawing shows an aligning device with four drive rollers 2 to 5. The drive shaft 1 extends over the entire width W of a plane of alignment 6 and is arranged parallel to the plane of alignment 6 in such a way that the plane of alignment 6 is tangential to contact surfaces of the drive rollers 2, 3, 4 and 5. The drive shaft 1 is connected to a drive motor 7 on the one side, and the drive motor is fixed on the outside of a lateral boundary 8 of the plane of alignment 6, and drives all drive rollers 2 to 5 jointly. The boundary 8 and a boundary 8' parallel thereto define the width W of the plane of alignment 6.

The side of the plane of alignment 6, a side which is oppositely disposed to the drive rollers 2 to 5, is formed by a base plate 9. The base plate 9 has a cut-out portion 10 in the region of the drive rollers 2 to 5. In the drawings, the base plate 9 has a greater cut-away portion in the region of the drive roller 2, so that the drawing may show details disposed beneath the base plate 9.

Pressure rollers 11 roll on respective contact surfaces of the drive rollers 2 to 5. The pressure rollers are arranged on the second side of the plane of alignment 6 in such a way that the plane of alignment 6 forms the common tangential plane between the drive rollers 2 to 5 and the pressure roller 11. A pair of rollers is formed by a respective one of the drive rollers 2 to 5 and a respective one of the contact rollers 11.

In the immediate vicinity of each of the drive rollers 2 to 5, a respective sensor is provided in the form of an angular encoder 16 which measures a local feed, effected by means of the respective drive roller 2 to 5 in the plane of alignment 6, of a sheet 24 which has been gripped by the pairs of rollers.

Each drive roller 2 to 5 advantageously has a respective measuring wheel 12, 13, 14 and 15 arranged on one side of that drive roller. Each measuring wheel is of the same circumference as the drive rollers 2 to 5, is constrained at its sides in the axial direction, and is mounted so as to be freely rotatable about the common drive shaft 1. Each cost-effective angular encoder 16 detects rotary movement of the respective measuring wheel 12, 13, 14 and 15, which is a direct measurement of the local feed of the sheet 24. A respective contact wheel 17 rolls on the contact surface of each measuring wheel 12 to 15. Each one of the measuring wheels 12 to 15 and its respective contact wheel 17 form a pair of wheels which likewise has the plane of alignment 6 as the common tangential plane. A drive group is formed by a pair of rollers and the directly adjacent pair of wheels.

The diameter of the drive rollers 2 to 5 and of the measuring wheels 12 to 15 is approximately 40 mm, the width of the contact surfaces thereof being 3 mm. The pair of rollers and the pair of wheels of the same drive group are at a mutual spacing of approximately 5 mm.

The pressure rollers 11 and the contact wheels 17 are preferably of the same diameter, e.g. 10 mm with contact surfaces which are 3 mm in width. They are guided individually by means of forks 18, wherein each fork 18 is mounted for pivoting in a plane vertical to the drive shaft 1. Under the effect of pressure force, the forks 18 resiliently push the pressure rollers 11 or the contact wheels 17 against the contact surface of the drive rollers 2 to 5 or of the measuring wheels 12 to 15. The drive shaft 1 and the axles of the pressure rollers 11 and of the contact wheels 17 lie in a common axial plane which is vertical to the base plate 9, the axial plane cutting the plane of alignment 6 along a line of intersection S. The pressure rollers 11 or the contact wheels 17 touch the contact surfaces of the drive rollers 2 to 5 or of the measuring wheels 12 to 15 along the line of intersection S.

The forks 18 which are associated with the pressure rollers 11 are e.g. connected by mechanical means to respective lifting devices 19. Each lifting device enable the respective pressure roller 11 to be lifted-off the contact surface of the respective drive roller 2, 3, 4 or 5 against the force or pressure, and independently of one another.

The alignment device is complemented by a control device 20. This is connected to the drive 7, the angular encoders 16 and the lifting devices 19 by means of circuits 21 to 23. The control device 20 contains a respective up/down counter for each angular encoder 16, and the content $Z_1$, $Z_2$, $Z_3$, or $Z_4$ of each counter can be read and compared to those of the other counters.

The sheet 24 is a rectangular sheet of a selected set of different sized sheets. It is conveyed, for example, in the plane of alignment 6 transversely to the longitudinal edge thereof in the feed direction 25 indicated by means of an arrow. The sheet 24 generally reaches the plane of alignment 6 so that it is not aligned parallel to the line of intersection S, the longitudinal edge instead forming an angle of twist with the line of intersection S.

The width W of the plane of alignment 6 is preferably by a predetermined amount than a length B of the longitudinal edge of the largest selected sheet 24, so that the aligning device can take the largest sheet 24 with a predetermined maximum admissible angle of twist $\alpha$. The maximum value for this depends on the shape of the sheet and may be, for example, 20°.

Advantageously, the distance A between the drive rollers 2 to 5 is less than the length B, reduced by a predetermined factor, of the smallest sheet 24 of the selected set of different sized sheets. The factor corresponds to half the cosine for the maximum angle of twist $\alpha$. Therefore, the smallest sheet 24 from the selected set is also able to be gripped by at least two of the drive rollers 2 to 5 at all admissible angles of twist $\alpha$ and independently of its position on the plane of alignment 6. The distance between the boundary 8 and one of the two outermost drive groups is approximately half the distance A.

The sheet 24 is guided to the alignment device at the angle of twist $\alpha$ from a first transportation device, not shown here, in the feed direction 25 in the plane of alignment 6. Some of the pairs of rollers grip the sheet 24 and align it parallel with the line of intersection S, i.e. they reduce the angle of twist $\alpha$ to zero, as described in more detail hereinafter. In this position, it is taken by a second transportation device, not shown here, and transported away.

Figure 2:
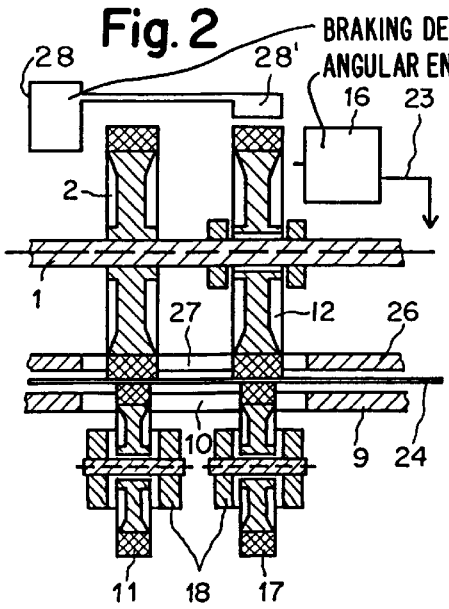
FIG. 2 shows a cross-section through a drive group.

By way of example, FIG. 2 shows a section through the common axial plane for the first drive group. It consists of the drive roller 2 which is fixed firmly to the drive shaft 1, the pressure roller 11, the rotatably mounted measuring wheel 12 and the contact wheel 17. The pressure roller 11 or the contact wheel 17 is rotatably mounted between the two tines of one of the two forks 18.

The pair of rollers 2, 11 and the pair of wheels 12, 17 clamp the sheet 24. On the side of the sheet 24 facing the drive shaft 1, a cover plate 26 covers the plane of alignment 6 and, together with the base plate 9 and the boundaries 8, 8' (FIG. 1), forms a passage. The cover plate 26 has a respective window 27 above each cut-out portion 10 in the base plate 9, so that there is no obstruction to the respective drive roller 2 and measuring wheel 12.

Each angular encoder 16 detects rotary movement made by the respective measuring wheel 12, optically or mechanically, for example. By way of a circuit 22, signal impulses reach the counters in the control device 20 (FIG. 1). Rotary movement made by each measuring wheel 12 and caused by local feed of the sheet 24 between that wheel 12 and the respective contact wheel 17 is recorded in both directions of rotation with the correct sign digit, so that the content of the associated counter in the control device 20 is a measurement of the local feed of the sheet 24 beneath the respective measuring wheel 12.

Advantageously, each pair of wheels formed by one of the measuring wheels 12 and the respective contact wheel 17 is fitted with a braking device 28, the braking action of which is adapted for pre-set adjustment. The braking action in turn prevents the wheels 12 and 17 of the pair of wheels from rotating further, as a result of their angular momentum and their nearly frictionless bearings, if the sheet 24 is no longer in contact with the pair of wheels, and on the other hand it provides a predetermined frictional force of the pair of wheels which is required for the aligning operation. In one example, the effect of the braking device 28 is selectable by the control device 20 preferably between a minimum and maximum predetermined value, by way of a circuit, not shown here.

As an example, FIG. 2 shows a simple mechanical braking device 28 which lowers a brake lining 28' onto the contact surface of the measuring wheel 12, in order to obtain the braking effect. The same action can also be achieved, for example, by braking the contact wheel 17, wherein the lining is protected on the contact surface of the measuring wheel 12 and the measured result is not falsified as a result of the diameter being reduced by wear. It is also possible to use other braking systems, for example an electrodynamic brake.

Preferably, the contact surfaces of the pairs of rollers and wheels have linings having a large static friction coefficient, in order to prevent undesired slippage between the pairs of rollers and pairs of wheels and the sheet 24, since such slippage makes accurate alignment impossible. The effect of the linings is directly dependent on the pressure force of the pressure roller 11 or of the contact wheel 17.

Figure 3:
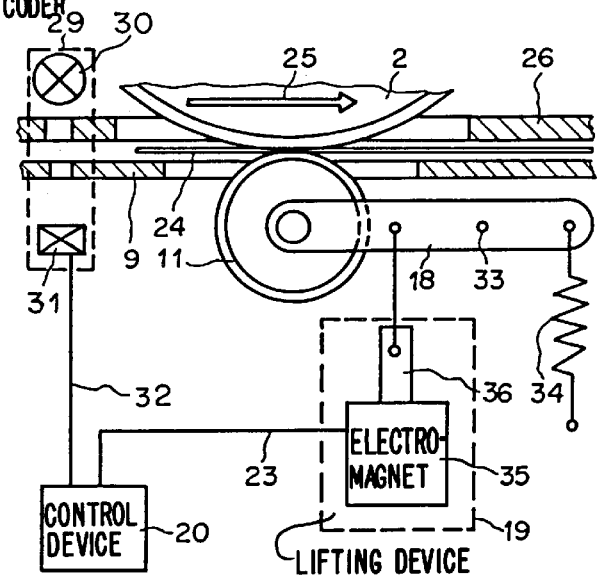
FIG. 3 shows a lifting device.

FIG. 3 shows, by way of example, a pair of rollers 2, 11 and the lifting device 19 therefor. For reasons of clarity, only one segment of the drive roller 2 is shown, namely that immediately above the sheet 24.

A parallel row of light barriers 29 is arranged in the form of position sensors in the feed direction 25 at a predetermined distance in front of the line of intersection S (FIG. 1). These position sensors detect the presence and position of the sheet 24 prior to the aligning operation, when it is being fed in the passage between the base plate 9 and the cover plate 26 in the direction of feed 25 towards the pairs of rollers. The distance between the adjacent light barriers 29 in the row is predetermined by the set of sheets 24, for example 10 mm.

Each of the light barriers 29 comprises a light transmitter 30, which is disposed, for example, above the cover plate 26, and a light receiver 31 fixed beneath the base plate 9. The light receiver 31 is connected to the control device 20 by way of a control circuit 32. The base plate 9 and the cover plate 26 have bores which are disposed directly over one another, so that the beam of light produced by the light transmitter 30 reaches the light receiver 31 through the bores in the plates 9, 26, if the sheet 24 does not interrupt the beam of light.

Each fork 18 is rotatable about an axis of rotation 33 which is perpendicular to the plane of FIG. 3. One arm of the fork 18 carries the respective pressure roller 11, and another arm is urged, for example by a tension spring 34, in such a way that the pressure roller 11 is pressed against the drive roller 2. Similar forks 18 and tension springs 34 are provided for mounting the contact wheels 17 and pressing them against the respective measuring wheels 12.

In a simple embodiment, the lifting device 19 associated with each pressure roller 11 comprises an electromagnet 35 with an armature rod 36. The electromagnet 35 can be excited from the control device 20 by means of a control signal on the control circuit 23. The armature rod 36, which is displaceable vertically with respect to the base plate 9, is linked to the fork 18 by means of a connecting link acting between the axis of rotation 33 and the axis of the pressure roller 11. When the electromagnet 35 is excited, the armature rod 36 is lowered, and the pressure roller 11 is lifted from the contact surface of the drive roller 2. The frictional connection between the drive roller 2 and the sheet 24 is thus cancelled, and the drive roller 2 glides over the sheet 24.

Figure 4:
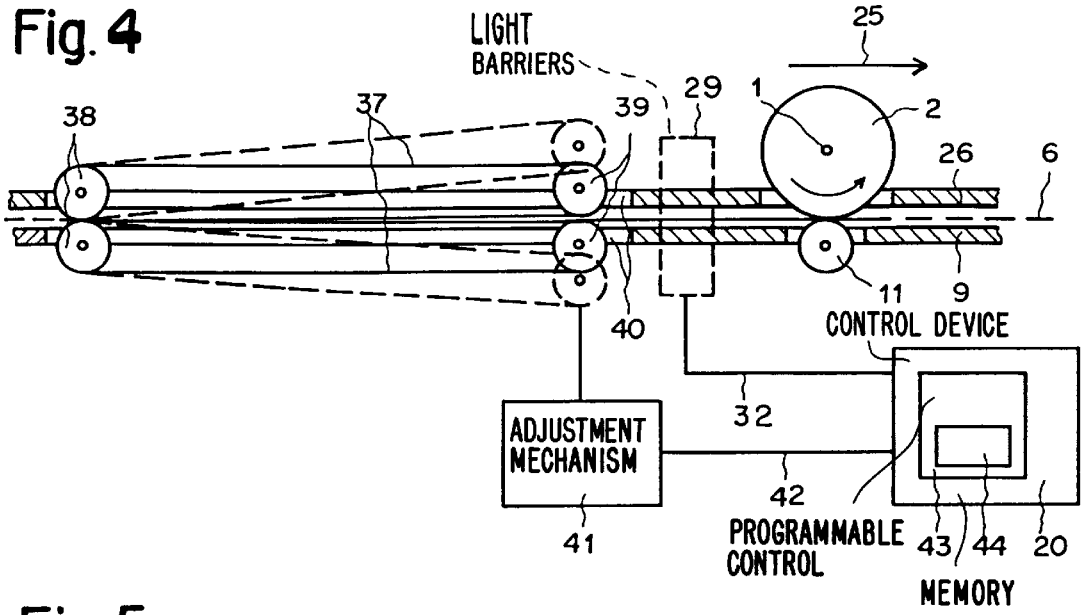
FIG. 4 shows a cross-section of a transportation device and the alignment device.

In FIG. 4, a first transportation device is arranged in front of the light barriers 29. It consists of at least one pair of transportation belts 37 which run over fixedly arranged belt pulleys 38 and over belt pulleys 39 which are displaceable perpendicularly to the plane of alignment 6. The transportation device is constructed symmetrically with respect to the plane of alignment 6, wherein displaceable belt pulleys 39 are oriented towards the pairs of rollers. The transportation belts 37 and the displaceable belt pulleys 39 have two positions, wherein the first position, marked by the solid lines, serves to transport the sheet 24, and the second position, shown by the broken lines, enables the aligning process to take place.

The belt pulleys 38 and 39 guide the transportation belts 37 in the first position in such a way that the transportation belts 37 make contact over a predetermined extent through recesses 40 in the base plate 9 and in the cover plate 26, and enclose the plane of alignment 6. The belt pulleys 39 are connected, by mechanical means, for example, to an adjustment mechanism 41, and are held thereby in one of the two positions.

An adjustment signal circuit 42 connects the control device 20 to the adjustment mechanism 41, which transmits an adjustment signal to the adjustment mechanism 41 by means of the adjustment signal circuit 42, so that the displaceable belt pulleys 39 are moved from the first position symmetrically away from the plane of alignment 6 into the second position, marked by broken lines, and the transportation belts 37 are separated. Except in the region of the fixedly arranged belt pulleys 38, the transportation belts 37 are moved from the plane of alignment 6 to the second position, and they release the sheet 24, preferably without delay so that unobstructed alignment takes place. A motor, not shown here, drives the belt pulleys 38, 39 and the transportation belts 37, wherein they feed the sheet 24 at the same speed as the drive groups.

An identical second transportation device, not shown here, the elements of which will hereinafter be denoted by the same reference numerals, is arranged with its pairs of rollers in mirror symmetrical relationship with respect to the first transportation device. The aligned sheet 24 is pushed in the feed direction 25 by the pairs of rollers between the separated transportation belts 37 of the second transportation device towards the belt pulleys 38, and after the adjustment signal has been removed, the transportation belts 37 are brought into contact with the sheet 24 and take hold of it for further transportation.

The advantage with these transportation devices is that the sheet 24 is driven through the alignment device for the whole period of its travel, whilst the alignment operation is unhindered and movement of the sheet 24 is controlled at all times. After the aligning operation, the sheet 24 is held firmly and is prevented from twisting again.

In its first position, the first transportation device conveys the sheet 24 in the feed direction to the pairs of rollers. One of the light barriers 29 detects the presence of the sheet, and sends a signal to the control device 20 by means of its control circuit 32. The control device 20 switches on the drive motor 7 (FIG. 1) and rotates the drive shaft 1 e.g. anti-clockwise, as shown by an arrow on the drive roller 2.

The control device 20 arrests the lifting devices 19 (FIG. 3) and the action of the braking device 28 (FIG. 2) so that the pressure rollers 11 can be placed on the contact surfaces of the drive rollers 2 to 5 (FIG. 1) and the pairs of wheels can rotate freely.

The transportation device conveys the sheet 24 further towards the pairs of rollers or drive groups, which are shown in FIG. 3 by way of example as drive roller 2 and pressure roller 11. One after the other, the front longitudinal edge of the sheet 24 covers adjacently disposed light barriers 29. From the sequence of signals of the light barriers 29, the control device 20 detects the position of the front edge of the sheet 24 and the angle of twist (FIG. 1) and the two optimum drive groups for aligning the sheet 24. This precautionary measure ensures that none of the selected drive groups rolls over one of the lateral edges of the sheet 24.

As soon as the front longitudinal edge of the sheet 24 is gripped by one of the pairs of rollers, the corresponding one of the measuring wheels 12 to 15 (FIG. 1) begins to rotate and the associated angular encoder 16 (FIG. 1) sends signal impulses to the control device 20, which adds them up in the respective associated counter in the direction of rotation of the measuring wheel 12, 13, 14 and 15. If one of the two selected counter contents $Z_1$ to $Z_4$ (FIG. 1) is different from zero, the control device 20 sends the adjustment signal by way of the adjustment signal circuits 42 to the adjustment mechanism 41 of the two transportation devices. The sheet 24 which has been released by the transportation belts 37 is now conveyed by at least one of the driver rollers 2 to 5.

Advantageously, the control device 20 contains an electronic, programmable control means 43 with a value memory 44, wherein the electronic control means 43 takes on all the functions of the control device 20, for example, and the value memory 44 contains measured values and predetermined adjustment parameters, e.g. dimensions of the sheets 24 of a selected set, which considerably simplify determination of the angle of twist $\alpha$.

The alignment procedure will now be described with the aid of the example shown in FIG. 1. The first transportation device (FIG. 4) feeds the sheet 24 to the pairs of rollers in the plane of alignment 6. The sheet 24 is aligned so that it is inclined to the line of intersection S with an accidental value of the angle of twist $\alpha$. In this example, it is gripped in turn by the fourth, third and second drive groups. The control device 20 has detected the position of the front longitudinal edge of the sheet 24 by using the light barriers 29 and defines as optimal the two drive groups with the pairs of rollers 5, 11 and 3, 11 and the associated counter contents $Z_2$ and $Z_4$.

At first, the sheet 24 is seized by the fourth pair of rollers 5, 11. The fourth counter in the control device 20 begins to increment the counter content $Z_4$ with the signal impulses from the angular encoder 16 of the measuring wheel 15; this has the effect of emitting an adjustment signal for the transportation devices.

Since the control device 20 considers only the two selected counter contents $Z_2$ and $Z_4$, it makes no other decisions as long as only the one counter content $Z_4$ is different from zero.

As soon as the front longitudinal edge of the sheet 24 is also seized by the second selected pair of rollers 3, 11, the counter content $Z_2$ of the second counter begins to increase. Since the two counter contents $Z_2$ and $Z_4$ are now different from zero, the control device 20 determines the appropriate state from the three possible ones: $Z_2>Z_4$, $Z_2=Z_4$ and $Z_2<Z_4$.

In this example, the counter content $Z_4$ is greater than the counter content $Z_2$. The control device 20 sends a control signal by way of the control circuit 23 to the lifting device 19 of the fourth pair of rollers 5, 11, in order to lift the pressure roller 11 and to reduce the local feed thereat. If present, the braking device 28 (FIG. 2) of the fourth pair of wheels 15, 17 is also switched on. Since the sheet 24 is now only driven by the second drive roller 3 and as a result of friction is braked in the region of the fourth pair of wheels 15, 17, the sheet 24 twists in the plane of alignment 6 about a pivot point beneath the fourth measuring wheel 15. Accordingly, the second counter continues to count its local feed correspondingly, but the fourth counter receives no, or only a few, additional signal impulses. When the difference between the two counter contents $Z_2$ and $Z_4$ reduces to zero, the sheet 24 is aligned with its front edge parallel to the line of intersection S. The control device 20 then switches off the control signal to the lifting device 19 of the fourth pair of rollers 5, 11. Therefore, the respective pressure roller 11 again presses the sheet against the fourth drive roller 5 and again produces the frictional connection of the fourth drive roller 5 with the sheet 24, so that the sheet 24 leaves the aligning device in an aligned condition. The adjustment signal is simultaneously released on the adjustment signal circuit 42 and the adjustment mechanism 41 returns both transportation devices to the first position, so that the second transportation device takes on the operation of further transporting the aligned sheet 24. If present, the action of the braking device 28 of the fourth pair of wheels 15, 17 is cancelled.

If the front longitudinal edge of the sheet 24 by chance reaches the two selected pairs of rollers 3, 11 and 5, 11 at the same time, the control device 20 must not engage, because the counter contents $Z_2$ and $Z_4$ would always be equal during transportation. The sheet 24 is, in this case, simply transported further on.

An analogous procedure takes place if the front edge of the sheet 24 first reaches the second pair of rollers 3, 11, or if, during the alignment procedure, the sheet 24 is aligned, for example, by the first and third or by the first and fourth drive groups or by two adjacent drive groups.

The alignment device is advantageous in that it delays on the leading side only for aligning the sheet 24, and, without stopping the sheet 24, it aligns it at high speed. The accuracy of alignment is determined by the resolution of the sensor (angular encoder 16). The afore-described aligning device has, for example, four drive groups and four counters integrated into the control device 20 and associated with the respective drive groups. In other embodiments, the alignment device has at least two pairs of rollers with the sensors therefor and with the associated counters therefor in the control device 20, and the number of these pairs of rollers is determined by the width W and by the dimensions of the selected set of sheets 24.

Instead of the independent adjustment device 41 (FIG. 4) associated with each transportation device, it is also possible for a single adjustment device 41 to be arranged so that it acts jointly on both transportation devices.

Figure 5:
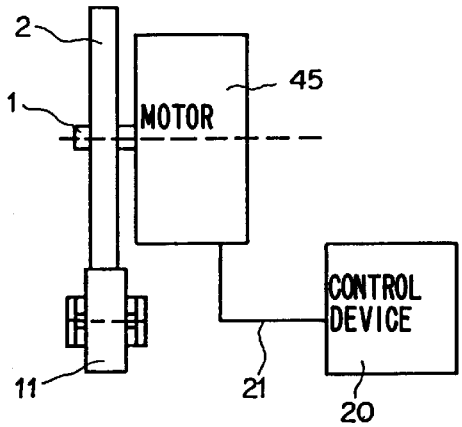
FIG. 5 shows a direct drive.

In an alternative embodiment, the drive group which is of a design such as that shown in FIG. 5 advantageously has pairs of rollers with a direct, independent drive by means of a respective stepping motor 45, for one roller of each pair. In this case there is no braking device 28 (FIG. 2). In FIG. 5 the pair of rollers 2, 11 is shown as an example of one of the pairs of rollers of the aligning device.

The drive roller 2 is mounted on the drive shaft 1 of the stepping motor 45. Each stepping motor 45 is connected to the control device 20 by way of its independent circuit 21, and is rotationally stepped by means of a sequence of drive impulses. The drive shafts 1 of all pairs of rollers are arranged in juxtaposed relationship and transverse with respect to the feed direction 25 (FIG. 1), wherein the pairs of rollers are at the predetermined distance A apart (FIG. 1) and the drive shafts 1 are aligned so that they are coaxial to one another.

Instead of the angular encoder 16, an advantageous and cost-effective sensor is an optic sensor without movable mechanical parts. The elements 12 to 17 (FIG. 2) are abandoned with this design, so that the drive groups are reduced to the pairs of rollers.

Figure 6:
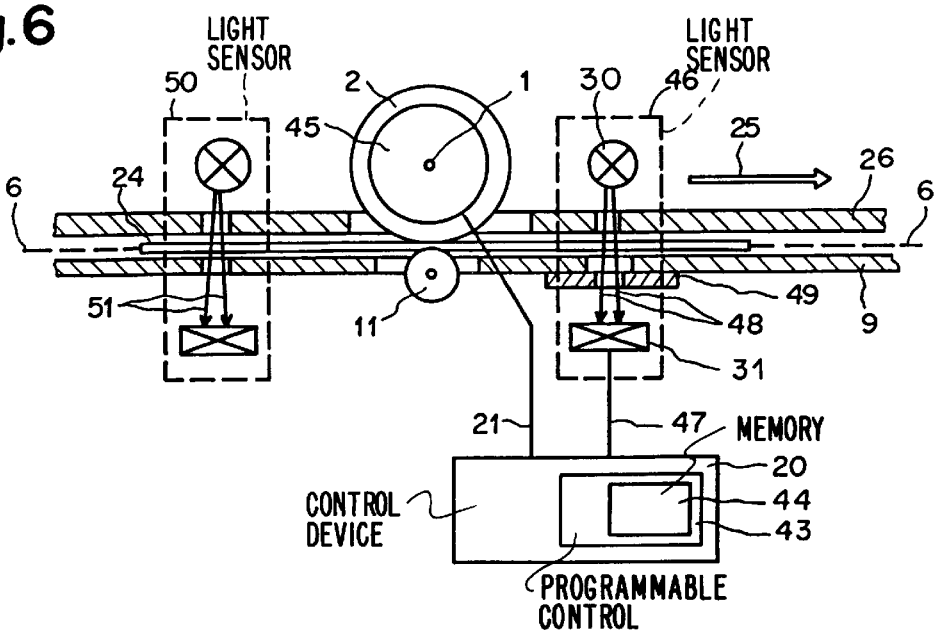
FIG. 6 shows the alignment device with light sensors.

The optic sensor shown in FIG. 6 is advantageously provided in the feed direction 25 at a predetermined distance from the line of intersection S (FIG. 1), and is connected, by means of a sensor circuit 47, to the control device 20, to act as a light sensor 46.

A beam of light 48 from the light sensor 46 is arranged vertically to the plane of alignment 6. A light transmitter 30 sends the beam of light 48 through openings in the cover plate 26 and in the base plate 9 to a light receiver 31. The analog sensor signals which are produced by the light receiver 31 are conveyed to the control device 20 by means of the sensor circuit 47, and are converted by electronic control means 43 into digital values of intensity with a resolution of e.g. 8 bits. As soon as the beam of light 48 is impaired by the sheet 24, the light receiver 31 becomes partially shaded, and the sensor intensity signal decreases.

The light sensors 46 form a row which is parallel to the line of intersection S and which is transverse across the plane of alignment 6. Seen in the feed direction 25 there is, for example, at least one light sensor 46 behind each drive roller 2 to 5 (FIG. 1), possibly displaced laterally by a predetermined number of millimeters, at a distance of some 20 mm from the line of intersection S.

At a given moment, for example when the light of the first light barrier 29 (FIG. 4) is interrupted by the sheet 24 coming into the plane of alignment 6, the electronic control means 43 establishes the value of intensity of each sensor signal, which value is stored for each light sensor 46 in the value memory 44 as a starting value.

In FIG. 6, the alignment process is shown using, by way of example, the direct drive of FIG. 5. The control device 20 determines, on the basis of the signals of the light barriers 29 (FIG. 4), as described hereinabove, the two optimum drive groups or pairs of rollers, and selects the two light sensors 46 which are disposed in the feed direction 25 directly behind the selected pairs of rollers. For each of the two selected light sensors 46, the electronic control means 43 periodically measures the instantaneous intensity value of the sensor signal, and determines its difference from the stored starting value, the difference being compared to a predetermined differential value for each light sensor 46. The differential values are placed in the value memory 44, for example.

The control device 20 simultaneously, and independently for each stepping motor 45, generates uniform drive impulses, wherein the pair of rollers convey the sheet 24 at the same speed as the transportation devices, not shown here. The stepping motors 45 of the pairs of rollers not selected have a high impedance on their circuits, so that the respective pairs of rollers and the non-selected stepping motors can rotate substantially freely. In addition, the pressure roller 11 of these pairs of rollers can be lifted.

As soon as the front longitudinal edge of the sheet 24 has been fed as far as the light sensors 46, the beam of light 48 of at least one of the two selected light sensors 46 is impaired. The instantaneous value of intensity of the sensor signal of this light sensor 46 decreases depending on the degree to which the light receiver 31 is shaded. When the difference between the instantaneous value of intensity and the starting value has reached the predetermined differential value, the electronic control means 43 generates a displacement signal, in response to which the two transportation devices release the sheet 24 for alignment. At the same time, the control device 20 reduces the speed of the stepping motor 45 associated with this light sensor 46, or it stops it and brakes it by means of a permanent signal on the circuit 21.

If, for example, the drive roller 2 is braked, the sheet 24 twists in the plane of alignment 6 about a pivotal point disposed beneath the drive roller 2, until the light receiver 31 of the second light sensor 46, selected by the control device, is shaded by the sheet 24 in such a way that the intensity values of the two sensor signals are equal to the respective starting values less the predetermined differential value.

The sheet 24 is thus aligned so that it is parallel to the line of intersection S. The accuracy of alignment can be altered by the selection of the differential value or by displacing a diaphragm 49, which is arranged in the path of light in front of the light receiver 31 of each light sensor 46. Both selected stepping motors 45 in turn receive uniform drive impulses. The displacement signal is switched off and the aligned sheet 24 is gripped by the second transportation device to be conveyed further. Then, once none of the light sensors 46 is covered, the electronic control means 43 once again determines the new starting values of the sensor signals.

If, accidentally, the sheet 24 is drawn out of the beam of light 48 of the first selected light sensor 46 by its twisting movement, or if the difference between the instantaneous intensity value of this light sensor 46 and the starting value changes, the pressure roller 11 is lowered onto the drive roller 2 and/or the stepping motor 45 which has been stopped is driven forwards or backwards, until the predetermined differential value is obtained again.

In a cost-effective embodiment of the sensors, optic sensors are advantageously provided in the form of a predetermined number of light barriers 29 (FIG. 4), and they are used to advantage to control the aligning operation, enabling the light sensors 46 and the sensor circuits 47 to be omitted. These selected light barriers 29 are hereinafter termed light sensors 50. As viewed in the feed direction 25, the light sensors 50 are arranged directly in front of each pair of rollers. A sensor beam 51 produces a signal in the light receiver 31' of the light sensor 50, and this signal is transmitted to the control device 20 by means of the control circuit 32. The intensity values of these signals are used not only qualitatively, together with those of the other light barriers 29, for detecting the position of the sheet 24, but since they are sensor signals they are also processed quantitatively to detect the local feed in the control device 20.

For the light sensors 50, the control means 43 periodically determines the above-described intensity values of the sensor signals, until the light of one of the light barriers 29 is interrupted for the first time, and the electronic control means compares these intensity values with the starting values which have been stored from the previous period.

As soon as the front longitudinal edge of the sheet 24 enters one of the light barriers 29, the electronic control means 43 stores the intensity values of the sensor signals from the previous period in the value memory 44 in the form of starting values. The control device 20 drives the stepping motors, and lowers the pressure rollers 11 onto the drive rollers 2 to 5 (FIG. 1). For the purpose of aligning the sheet 24, the control device 20, as described hereinabove, uses the signals from the light barriers 29 as a basis for determining the two optimum drive groups and the two associated light sensors 50.

The sheet 24 is transported beneath the drive rollers 2 to 5, and the intensity of the sensor beams 51 decreases to a minimum value because of the complete obstruction by the sheet 24. The electronic control means 43 compares the difference between the instantaneous intensity values of the sensor signals of the two selected light sensors 50, with the starting values.

As soon as the rear longitudinal edge of the sheet 24 partially releases the sensor beam 51 in one of the light sensors 50, the intensity of the respective sensor signal begins to increase again. The control device 20 triggers the aligning process by delaying or blocking the stepping motor 45 of that one of the pair of rollers, whose difference between the instantaneous intensity value of the sensor signal of its associated light sensor 50 and the respective starting value has reached the predetermined differential value, and the process ends when the predetermined differential value has been reached for both selected light sensors 50.

What is claimed is:

1. A device for aligning a single sheet fed in a plane of alignment in a feed direction, comprising:

at least two drive groups which are controllable independently of each other, each drive group comprising a respective drive roller, and a respective pressure roller which contacts the respective drive roller generally in the plane of alignment so that the sheet can be driven between the drive roller and the respective pressure roller wherein the drive rollers of the drive groups are disposed on a common shaft mounted transversely of the feed direction;

a position detector operable to detect an angle of twist of the sheet; and a control device responsive to the position detector to adjust a local feed speed of each drive group in dependence upon the angle of twist of the sheet.

2. A device according to claim 1, wherein the position detector comprises a series of light barriers for detecting the position of the sheet upstream of the drive rollers and sensors for detecting the local feed speed of the sheet.

3. A device according to claim 1, wherein a single drive motor is provided for jointly driving the drive rollers by means of the common drive shaft, and each pressure roller having a respective lifting device, the lifting devices being controllable independently by means of the control device for lifting the respective pressure rollers from the respective drive rollers.

[4. A device according to claim 1, wherein each drive roller has a stepping motor which is controlled independently by the control device.]

5. A device according to claim 2, wherein each of said sensors comprises an angular encoder which senses rotary movement of a respective measuring wheel which is freely rotatable on a common shaft of [the respective] *an associated drive* roller and a contact wheel being associated with each measuring wheel and rolling on [the] *a* contact surface of the respective measuring wheel.

6. A device according to claim 5, wherein each measuring wheel has a controllable braking device.

7. A device according to claim 2, wherein each sensor is a light sensor which has a light transmitter on one side of the plane of alignment and a light receiver on the other side thereof, the control device being operable to measure the local feed in the region of each light sensor based on the degree of shading of the respective light receiver by the sheet.

8. A device according to claim 1, 2, 3, [4,] 5, 6 or 7 wherein there are at least three such drive groups, the distance between each adjacent pair of the drive rollers of the respective drive groups being less than the length, reduced by a predetermined factor, of a smallest sheet of a preselected set of different sized sheets, and the control device being operable to determine an optimum pair of the drive groups from the signals of the position detector for aligning the sheet.

*9. A device for aligning a single sheet fed in a plane of alignment in a feed direction, comprising:*

*at least two drive groups which are controllable independently of each other, each drive group comprising a respective drive roller, and a respective pressure roller which contacts the respective drive roller generally in the plane of alignment so that the sheet can be driven between the drive roller and the respective pressure roller;*

*a detector operable to detect an initial angle of twist of the sheet as the sheet becomes engaged by the drive groups and at least one subsequent angle of twist as the sheet is driven by the drive groups; and*

*a control device responsive to the detector to adjust a local feed speed of each drive group in dependence upon the initial angle of twist and the subsequent angle of twist of the sheet.*

*10. A device according to claim 9, wherein the detector comprises a series of light barriers for detecting the initial angle of twist.*

*11. A device according to claim 9, wherein a single drive motor is provided for jointly driving the drive rollers by means of the common drive shaft, and each pressure roller has a respective lifting device, the lifting devices being controllable independently by means of the control device for lifting the respective pressure rollers from the respective drive rollers.*

*12. A device according to claim 9, wherein each drive roller has a stepping motor which is controlled independently by the control device.*

*13. A device according to claim 9, further comprising at least two measuring wheels which are freely rotatable on a common shaft with at least two of the drive rollers, and a contact wheel associated with each measuring wheel and rolling on a contact surface of the measuring wheel, wherein the detector comprises an angular encoder which senses rotary movement of at least two of the measuring wheels.*

*14. A device according to claim 10, further comprising at least two measuring wheels which are freely rotatable on a common shaft with at least two of the drive rollers, and a contact wheel associated with each measuring wheel and rolling on a contact surface of the measuring wheel, wherein the detector further comprises an angular encoder which senses rotary movement of at least two of the measuring wheels to detect the subsequent angle of twist.*

*15. A device according to claim 13, wherein each measuring wheel has a controllable braking device.*

*16. A device according to claim 10, wherein the detector further comprises a plurality of light sensors which have a light transmitter on one side of the plane of alignment and a light receiver on the other side thereof, the control device being operable to measure the local feed in the region of each light sensor based on the degree of shading of the respective light receiver by the sheet to detect the subsequent angle of twist.*

*17. A device according to claim 9, wherein there are at least three such drive groups, the distance between each adjacent pair of the drive rollers of the respective drive groups being less than the length, reduced by a predetermined factor, of a smallest sheet of a preselected set of different sized sheets, and the control device being operable to determine an optimum pair of the drive groups from the signals of the position detector for alignment the sheet.*

*18. A device for aligning a single sheet fed in a plane of alignment in a feed direction, comprising:*

*at least three drive groups which are controllable independently of each other, each drive group comprising a respective drive roller, and a respective pressure roller which contacts the respective drive roller generally in the plane of alignment so that the sheet can be driven between the drive roller and the respective pressure roller;*

*a detector including a series of light barriers operable to detect an angle of twist of the sheet, wherein the light barriers detect the initial angle of twist and the detector further comprises a plurality of light sensors which have a light transmitter on one side of the plane of alignment and a light receiver on the other side thereof;*

*a control device responsive to the detector to adjust a local feed speed of each drive group in dependence upon the angle of twist, the control device being operable to measure the local feed in the region of each light sensor based on the degree of shading of the respective light receiver by the sheet to detect at least one subsequent angle of twist and to adjust a local feed speed of each drive group in dependence on the initial and subsequent angles of twist; and*

*wherein the distance between each adjacent pair of the drive rollers of the respective drive groups is less than the length, reduced by a predetermined factor, of a smallest sheet of a preselected set of different sized sheets, and the control device is operable to determine an optimum pair of the drive groups from the signals of the detector for aligning the sheet.*

*19. A device for aligning a single sheet fed in a plane of alignment in a feed direction, comprising:*

*at least two drive groups which are controllable independently of each other, each drive group comprising a respective drive roller, and a respective pressure roller which contacts the respective drive roller generally in the plane of alignment so that the sheet can be driven between the drive roller and the respective pressure roller;*

*at least two measuring wheels which are freely rotatable on a common shaft with at least two of the drive rollers, and a contact wheel associated with each measuring wheel and rolling on a contact surface of the measuring wheel;*

*a first detector comprising a series of light barriers for detecting an initial angle of twist of the sheet;*

*a second detector comprising an angular encoder which senses rotary movement of at least two of the measuring wheels to detect at least one subsequent angle of twist of the sheet; and*

*a control device responsive to the detector to adjust a local feed speed of each drive group in dependence upon the initial angle of twist and subsequent of twist of the sheet.*

*20. A method of aligning a single sheet fed in a plane of alignment in a feed direction by at least two drive rollers comprising:*

*detecting an initial angle of twist of the sheet;*

*adjusting the feed speed of each drive roller dependent upon the initial angle of the twist to deskew the sheet;*

*driving the sheet by the drive rollers;*

*detecting a subsequent angle of twist of the sheet while the sheet is being driven by the drive rollers; and*

*adjusting the feed speed of each drive roller dependent upon the subsequent angle of twist if necessary to further deskew the sheet.*

*21. A device for aligning a single sheet fed in a plane of alignment in a feed direction, comprising:*

*at least three drive groups which are controllable independently of each other, each drive group comprising a respective drive roller, and a respective pressure roller which contacts the respective drive roller generally in the plane of alignment so that the sheet can be driven between the drive roller and the respective pressure roller;*

*a detector including a series of light barriers operable to detect an angle of twist of the sheet;*

*a control device responsive to the detector to adjust a local feed speed of each drive group in dependence upon the angle of twist; and*

*at least two measuring wheels which are freely rotatable on a common shaft with at least two of the drive rollers, and a contact wheel associated with each measuring wheel and rolling on a contact surface of the measuring wheel, wherein the detector comprises an angular encoder which senses rotary movement of at least two of the measuring wheels, the light barriers detect an initial angle of twist of the sheet and the angular encoder detects a subsequent angle of twist of the sheet, and the control device adjusts the local feed speed of each drive group in dependence on the initial and subsequent angles of twist;*

*wherein the distance between each adjacent pair of the drive rollers of the respective drive groups is less than the length, reduced by a predetermined factor of a smallest sheet of a preselected set of different sized sheets, and the control device is operable to determine an optimum pair of the drive groups from the signals of the detector for aligning the sheet.*

* * * * *